United States Patent
Evans et al.

(10) Patent No.: US 11,670,003 B2
(45) Date of Patent: Jun. 6, 2023

(54) SPATIAL LIGHT MODULATOR SEEKER CALIBRATION

(71) Applicant: Simmonds Precision Products, Inc., Vergennes, VT (US)

(72) Inventors: Owen Daniel Evans, Burnsville, MN (US); Jason Graham, Prior Lake, MN (US); Robert D. Rutkiewicz, Edina, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 64 days.

(21) Appl. No.: 17/328,843

(22) Filed: May 24, 2021

(65) Prior Publication Data

US 2022/0375127 A1    Nov. 24, 2022

(51) Int. Cl.
*G06T 7/80* (2017.01)
*H04N 23/55* (2023.01)
*H04N 23/75* (2023.01)

(52) U.S. Cl.
CPC .............. *G06T 7/80* (2017.01); *H04N 23/55* (2023.01); *H04N 23/75* (2023.01); *G06T 2207/10048* (2013.01); *G06T 2207/10152* (2013.01)

(58) Field of Classification Search
CPC .... H04N 5/2354; H04N 5/238; H04N 5/3651; G06T 2207/10152; G06T 7/80
See application file for complete search history.

(56) References Cited

U.S. PATENT DOCUMENTS

| | | | | |
|---|---|---|---|---|
| 5,323,002 | A * | 6/1994 | Sampsell | H04N 5/33 |
| | | | | 250/493.1 |
| 6,339,219 | B1 * | 1/2002 | Ishizuya | G01J 5/40 |
| | | | | 250/330 |
| 8,872,111 | B2 * | 10/2014 | Burkland | F42B 15/01 |
| | | | | 250/338.1 |
| 10,798,309 | B2 | 10/2020 | Mercier et al. | |
| 2006/0170774 | A1 | 8/2006 | Coppola et al. | |
| 2007/0103742 | A1 | 5/2007 | Ernandes et al. | |
| 2009/0161001 | A1 * | 6/2009 | Eisen | H04N 23/56 |
| | | | | 348/360 |
| 2012/0019713 | A1 | 1/2012 | Gudlavalleti et al. | |

(Continued)

FOREIGN PATENT DOCUMENTS

| | | |
|---|---|---|
| CN | 111601052 A | 8/2020 |
| RU | 2729946 C1 | 8/2020 |

OTHER PUBLICATIONS

Extended European Search Report for European Patent Application No. EP22175220.7, dated Oct. 19, 2022.

*Primary Examiner* — Jayanti K Patel
*Assistant Examiner* — Christopher Kingsbury Glover
(74) *Attorney, Agent, or Firm* — Locke Lord LLP; Joshua L. Jones; Scott D. Wofsy

(57) ABSTRACT

In certain embodiments, an imaging system includes an enclosure with an objective aperture opening into an interior space of the enclosure, an optical assembly optically coupling the objective aperture to an imaging sensor within the enclosure, a spatial light modulator (SLM) mounted to the objective aperture for selectively blocking and admitting illumination through the objective aperture into the interior space, and an illuminator mounted to illuminate the interior space of the enclosure.

15 Claims, 2 Drawing Sheets

(56) References Cited

U.S. PATENT DOCUMENTS

2012/0211648 A1* 8/2012 Linsacum ............ H04N 25/671
                                                          250/252.1
2017/0048473 A1* 2/2017 Hall .................... H04N 25/672
2020/0162656 A1* 5/2020 Mercier ................ H04N 23/71

* cited by examiner

SPATIAL LIGHT MODULATOR SEEKER CALIBRATION

BACKGROUND

1. Field

The present disclosure relates generally to imaging systems, and more particularly to imaging systems such as used in seeker systems for targeting and the like.

2. Description of Related Art

Seekers such as in guided munitions and other targeting systems utilize an imaging sensor and optics for forming images used in targeting. Imaging sensors need calibration and are traditionally calibrated prior to deployment in the field. In the field, there are various events that can present an undesired external stimulus to the sensor. Re-calibration would traditionally require being brought back into a lab environment. While the traditional techniques have been considered sufficient for their intended purposes, there is an ongoing need for improved systems and methods.

SUMMARY

In certain embodiments, an imaging system includes an enclosure with an objective aperture opening into an interior space of the enclosure, an optical assembly optically coupling the objective aperture to an imaging sensor within the enclosure, a spatial light modulator (SLM) mounted to the objective aperture for selectively blocking and admitting illumination through the objective aperture into the interior space, and an illuminator mounted to illuminate the interior space of the enclosure.

A window is disposed in the objective aperture bounding the interior space together within the enclosure such that the SLM is assembled to the window. An imaging board is operatively connected to the imaging sensor. In embodiments, the imaging sensor is sensitive to SWIR wavelengths. In certain embodiments, an SLM controller is operatively connected to the imaging board to control the SLM, and an illuminator controller is operatively connected to the imaging board to control the illuminator.

The imaging board includes machine readable instructions configured to cause the imaging board perform at least one of: blocking, with the SLM, illumination outside the enclosure from reaching the interior space, illuminating, with the illuminator, the interior space, and capturing, with the imaging sensor, a calibration image using illumination from the illuminator.

The machine readable instructions are configured to further cause the imaging board to use the calibration image to calibrate the imaging sensor for capturing images with non-uniformity correction. In certain embodiments, the machine readable instructions are configured to further cause the imaging board to compensate for an illumination gradient on the imaging sensor from non-uniform illumination from the illuminator on the imaging sensor. In certain embodiments, the machine readable instructions are configured to further cause the imaging board to run calibration at multiple illumination levels of the illuminator and form a respective calibration image at each illumination level for non-uniformity calibration. In certain embodiments, the machine readable instructions are configured to further cause the imaging board to form non-uniformity corrected images after calibration is complete.

A method comprises blocking, with an SLM mounted to an objective aperture, illumination outside an enclosure of the objective aperture from reaching an interior space of the enclosure, illuminating, with an illuminator, the interior space, and, capturing, with an imaging sensor optically coupled to the objective aperture, a calibration image using illumination from the illuminator.

In embodiments, the method further includes, using the calibration image to calibrate the imaging sensor for capturing images with non-uniformity correction. In certain embodiments, the method further includes, compensating for an illumination gradient on the imaging sensor from non-uniform illumination from the illuminator on the imaging sensor. In certain embodiments, the method further includes running calibration at multiple illumination levels of the illuminator and forming a respective calibration image at each illumination level for non-uniformity calibration. In certain embodiments, the method further includes, forming non-uniformity corrected images after calibration is complete.

In embodiments, blocking can further include at least one of using the SLM to actively block direct sunlight from reaching the imaging sensor, using the SLM to actively block one or more bright spots from reaching the imaging sensor, and/or using the SLM to actively block counter measures. In certain embodiments, the method is performed outside of a calibration lab, after an undesired external stimulus to the imaging sensor compromises an initial calibration that was performed prior to the undesired external stimulus to the imaging sensor.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
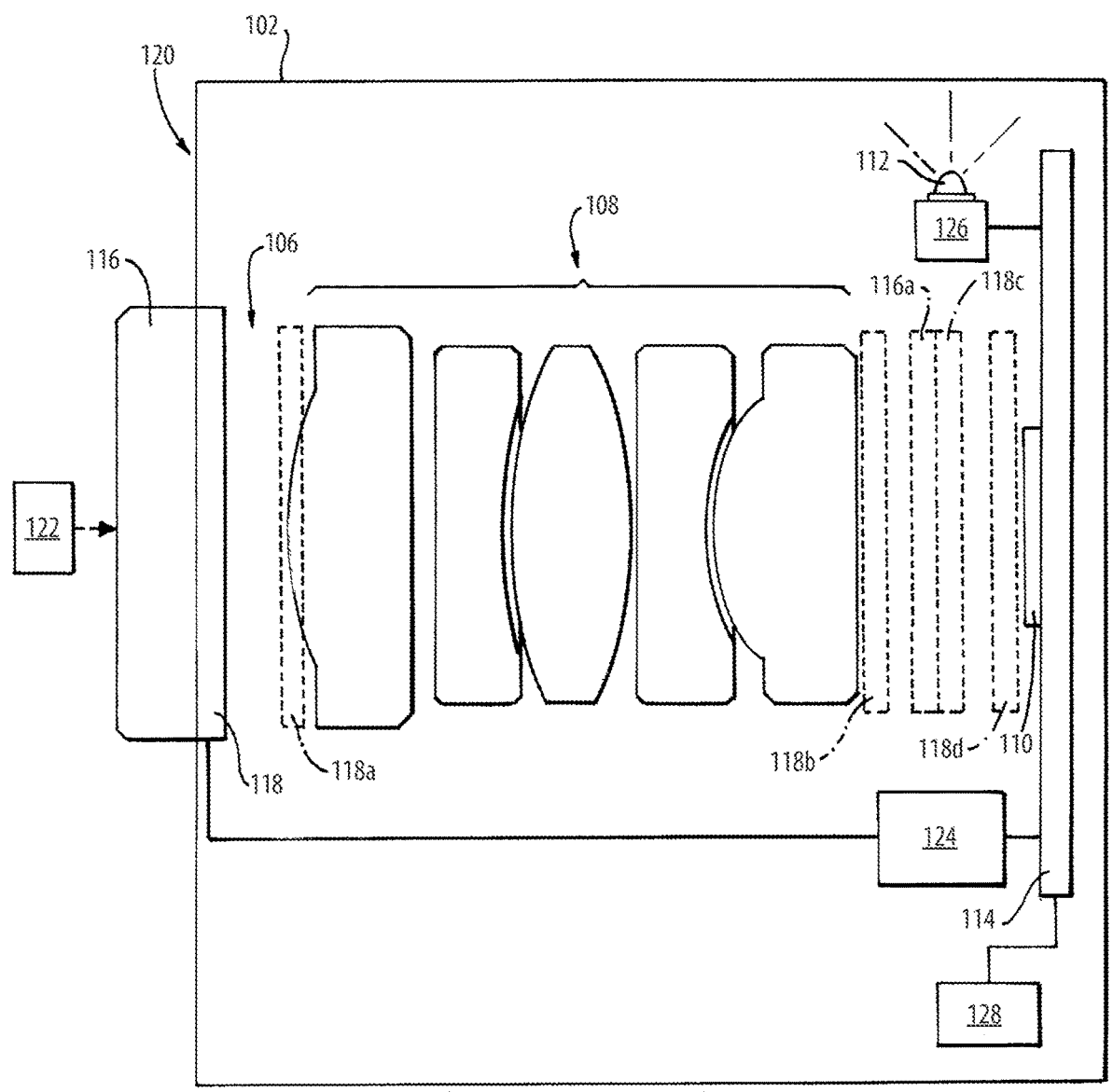
FIG. 1 is a schematic plan view of an embodiment of an imaging system constructed in accordance with the present disclosure, showing an arrangement of optical components within the imaging system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used for real-time embedded non-uniformity correction (NUC) calibration and enhancing scene capture capabilities.

In conventional SWIR sensor the sensing material and pixel electronics will vary over temperature. This dependency on temperature is minimized by using temperature stabilizing cooling elements, thermoelectric coolers, or incorporating a temperature sensor and determining NUC values over the operating temperature range. The NUC performance is checked at the factory after calibration where the illumination and temperature environment are adjusted. Without returning to a calibration lab, SWIR sensors do not have a method of validating existing NUC values or recalibrating themselves if there is a change in performance created by external stimuli, such as high vibrations and mechanical shocks.

For high dynamic range scenes, there are limitations of minimum threshold and saturation within a single frame capture. The minimum threshold limit is avoided by using a higher gain value. The saturation limit requires a lowering of the global gain. For very high light intensity, an additional effect occurs where the number of electrons is greater than the individual pixel can accept. These excess electrons migrate to neighboring pixels making the light source appear bigger. The global gain has no effect in this condition. The use of a spatial light modulator (SLM) going partially opaque, over the full scene or over the individual pixel, limits the rate of photons entering the sensor to below the threshold, removing the migrating electron effect. The SLM enables enhanced image capture and improves means to perform NUC calibration.

Therefore, in order to provide high quality uniform pixel performance in the images with a SWIR InGaAs sensor, a large amount of upfront calibration before use is required to characterize the functionality of the sensor. This calibration is also utilized to create Non Uniformity Correction (NUC) tables to correct differences in pixel values at a constant light level. The manufacturing SWIR NUC calibration process typically uses an integrated sphere with a variable light source and creates a uniform illumination. The illumination source is then applied to the SWIR sensor within a temperature chamber. This is a long duration calibration process as the testing is performed at multiple temperatures, multiple light levels, and over a range of global gain settings. A large number of images are captured and then processed to generate a set of correction values based on the collected calibration data.

Such a long calibration process proves disadvantageous when calibration needs to be performed quickly, and without access to a calibration lab. Inclusion of an SLM in the imaging system 100 as described herein removes the need to calibrate NUC values across temperatures ranges prior to encountering a new temperature environment because the SLM is used in-situ. The SLM can therefore be used to collect real time calibration data as needed.

As shown in FIG. 1, the imaging system 100 includes an enclosure 102 forming an interior space 104 for housing the hardware required for the system 100, as can be impervious to light leakage. An objective aperture 106 opens into the interior space, and an optical assembly 108 optically couples the objective aperture 106 to an imaging sensor 110 within the enclosure 102. The optical assembly can include any suitable optical components, for example a series of lenses placed in front of the sensor 110 to focus light into the sensor 110. An illuminator 112 (e.g. a SWIR LED light source) is mounted to illuminate the interior space 104 of the enclosure 102, for example to enable internal system lighting of the sensor 110. An imaging board 114 is included within the enclosure 102 and can include the imaging sensor 110 (e.g. a singular sensor or an array, sensitive to SWIR wavelengths), for example to capture images and/or video.

In embodiments, the SWIR sensor 110 has the capability to vary the gain of the sensing array, the global gain control being common to all pixels. This enables a smoothly varying, non-uniform illumination to be used instead of a globally uniform illumination. For example, pixel count value deviation from a nominal value can be captured assuming the smooth, low variation across the sensing array is uniform across small regions.

An optical window 116 is disposed in the objective aperture 106 bounding the interior space 104 together within the enclosure 102, where an SLM 118 is assembled to the window 116. For example, the window 116 can be placed on an exterior barrier 120 of the enclosure to allow light to enter in a controlled location.

The SLM 118 is mounted to the objective aperture 106 for selectively blocking and admitting illumination through the objective aperture 106 into the interior space 104. For example, the SLM 118 can decrease the light transmission allowing an increase in the maximum light intensity allowed in a scene without the need for a change in aperture or expose time. In addition, the SLM 118 can be used to modulate or shutter incoming light such that the imaging sensor 110 could be synchronized to external light sources 122 in either enhancing light sources or filtering out illumination noise.

In certain embodiments the SLM 118 can be placed on the backside of the window 116 to control the amount of light transmitted through the window 116 (e.g. as shown in FIG. 1). In certain embodiments, the SLM 118$a$, $b$, $c$, $d$ can be included on one or more of the optical lenses 108, on a window 116$a$ between optics and the sensor 110, or placed directly on the sensor 110 (e.g. as shown in phantom in FIG. 1). An SLM controller 124 is operatively connected to the imaging board 114 to control the SLM 118, for example to control the desired light transmissibility. An illuminator controller 126 is operatively connected to the imaging board 114 to control the illuminator 112, for example to control light level and timing.

For purposes of example and explanation, and not limitation, the SLM 118 can be configured in a number of ways, e.g. using the SLM controller 124. For example, the SLM 118 can be configured for global addressing, such that the entire device 118 goes opaque or transparent. In another example, the SLM 118 can be configured for line addressing. In another example, the SLM 118 can be configured for individual pixel addressing or pixel region addressing based on the resolution differences between SWIR sensor 110 and SLM material. Addressable pixels in the SLM 118 can locally decrease light levels (point sources or reflections for example) and prevent excess photoelectron migration to adjacent pixels. As introduced above, the addressable items may be, for example, any one or all of: liquid crystals that control the transmission by going opaque or transparent or mirrors that reflect light in one orientation, externally or externally, and go transparent in another orientation.

In certain instances, the SLM 118 may be fully transparent, for example to allow external light 122 to pass through and viewing the scene or calibrating based on scene light levels. In certain instances, the SLM 118 may be completely opaque while the SWIR light source 112 is off, for example, for dark scene (dark noise) calibration. In certain instances, the SLM 118 may be completely opaque while the SWIR light source 112 is on, for example, for bright scene calibration. In certain instances, the SLM 118 may be partially transparent, while the SWIR light 112 source either on or off, for example, for varied light level calibration.

In embodiments, the imaging board 114 can include machine readable instructions. The machine readable instructions can be configured to cause the imaging board 114 to perform any one or all of the following actions: using the SLM 118, blocking illumination 122 outside the enclosure 102 from reaching the interior space 104; using the illuminator 112, illuminating the interior space 104; and/or with the imaging sensor 110, capturing a calibration image using illumination from the illuminator 112.

Blocking light from passing through focusing optics 108 removes external pixel level illumination sources and enables NUC calibration. Illuminating the interior space 104 with the internal SWIR illuminator 112 enables such calibration to generate a non-focused illumination within the optics 108 and ensure the full range of photodetector operation is exercised and NUC calibrated. The light blocking function with an internal light source 112 therefore provides an ability to NUC calibrate the full range of light levels without waiting for ambient external light sources to occur. This enables NUC corrected images to be generated before the first external scene image acquisition with the image sensor.

For example, the machine readable instructions can be configured to further cause the imaging board 114 to use the calibration image to calibrate the imaging sensor 110 for capturing images with non-uniformity correction. In certain embodiments, the machine readable instructions are configured to further cause the imaging board 114 to compensate for an illumination gradient on the imaging sensor 110 from non-uniform illumination from the illuminator on the imaging sensor. In certain embodiments, the machine readable instructions are configured to further cause the imaging board 114 to run calibration at multiple illumination levels of the illuminator 112 and form a respective calibration image at each illumination level for non-uniformity calibration. As such, the calibration is not a single point correction at low light level, but instead can be run along the gradient at chosen intervals from the lowest intensity and saturation to the highest intensity and saturation. In certain embodiments, the machine readable instructions are configured to further cause the imaging board 114 to form non-uniformity corrected images after calibration is complete.

While NUC calibration as described herein does not need uniform illumination across the array, it expects a sufficiently smooth (non-speckled) illumination. Therefore, in certain embodiments, a De-Speckle module 128 can be used to perform a de-speckle algorithm to measure the individual pixel variation within the smooth illumination areas. The measured pixel variation provides the data to compute the NUC value for the individual pixel. Smoothed area illumination can then be readily captured when light is not focused through a lens.

A method, for NUC calibration includes, blocking, with the SLM 118, illumination 122 outside the enclosure 102, illuminating, with the illuminator 112, the interior space 104, and, capturing, with the imaging sensor 110, a calibration image using illumination from the illuminator 112. In embodiments, the calibration image can be used to calibrate the imaging sensor 110 for capturing images with non-uniformity correction.

In certain embodiments, the method further includes, compensating for an illumination gradient on the imaging sensor 110 from non-uniform illumination from the illuminator 112 on the imaging sensor 110. In certain embodiments, the method further includes running calibration at multiple illumination levels of the illuminator and forming a respective calibration image at each illumination level for non-uniformity calibration. In certain embodiments, the method further includes, forming non-uniformity corrected images after calibration is complete.

In certain embodiments the external ambient light source may be used in place of the internal lights source. The SLM 118 may vary the light global scene illumination passing through the optics and onto the sensor for individual scene image frames, generating a set of light intensities used for calibration. The SLM 118 may vary the pattern across the scene so pixel light intensity from the scene may be made to vary more or less than the original variation to acquire the various pixel light intensities used for NUC calibration.

Figure 2:
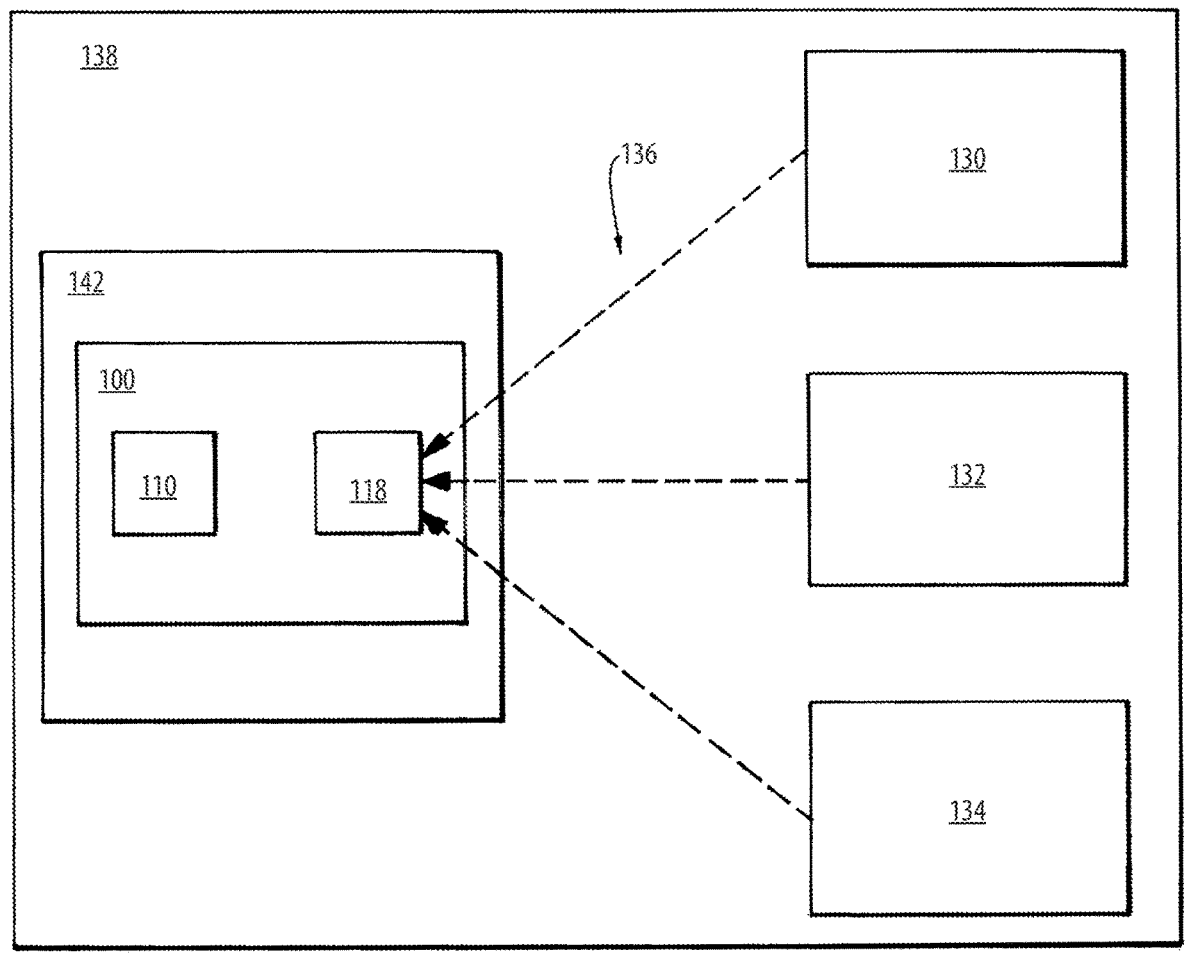
FIG. 2 is a schematic box diagram showing the system of FIG. 1 interacting with an environment.

Referring now to FIG. 2, in certain embodiments, blocking illumination outside the enclosure 102 can include actively blocking direct sunlight 130 from reaching the imaging sensor 110, actively blocking one or more bright spots 132 from reaching the imaging sensor 110, and/or using the SLM to actively block counter measures 134.

As described herein, addressable pixels in the SLM 118 could locally decrease light levels (e.g. point sources or reflections for example) and prevent excess photoelectron migration to adjacent pixels. For high dynamic range scenes, addressable pixel filtering enables adaptive gain control which can be used to maximize information content for a given scene. These addressable pixels can be used to block out undesired external stimuli (e.g. high intensity light sources) 136 to the sensor 110 such as external light 122 (e.g. sunlight 130) spots from laser designators (e.g. bright spots 132), reflections, high intensity sources such as the sun or fireworks, and the like, remove spoofing (e.g. counter measure 134) or other laser designator codes, without needing to end the sensor exposure.

With sensors 110 that detect pulse images, the SLM 118 can function with the pulse channel pixels to block areas where high light intensity light source photoelectrons would saturate the imaging channel pixel. This adds a function to the standard integrated image by turning it into an effective low pass frequency image The SLM 118 blocks the high frequency light sources detected in the pulse channel, which can be useful for removing instantaneous flashes from lightning, explosions or reflections in the imaging channel to result in higher information content. Such functionality may be similar to that in electronic welder goggles that react to the presence of the blinding weld arc.

The light blocking function with an internal light source provides an ability to NUC calibrate the full range of light levels without waiting for ambient external light sources to occur. This enables NUC corrected images to be generated before the first external scene image acquisition. In certain applications a scene may not be visible at power on, the system 100 as provided herein thus allows a NUC calibration to be run or verified before the scene is viewable.

Additionally, this allows the system 100 to be used, and the method to be performed in the field 138 outside of a calibration lab, even after an external environment condition such as physical shock, temperature shock, vibration, high intensity light source 136 or other extreme condition on the imaging sensor 100 compromises its initial calibration. For example, the system can be included on a moving a physical resource 142 (e.g. guided munition or imaging platform such as a drone or satellite), wherein the method can include guiding the movement of the resource 142 (e.g. a guided munition, a flight body, an airframe, or the like) using images taken after field calibration of the imaging sensor 110. Additional calibration can be performed after any number of high intensity light source stimuli 136, or extreme environmental exposures without requiring that the resource be grounded.

For several use cases such as calibration during operation or adaptive filtering for scenes with bright point sources, the SLM dynamic performance characteristics are important factors to consider. The SLM spatial resolution should be on par or better with the SWIR sensor resolution to provide the greatest flexibility for adaptive filtering at the pixel level. The SLM temporal response should be on par or better with the maximum frame rate of the SWIR sensor to provide the greatest flexibility for utilizing the imaging bandwidth. SLM filtering changes will take time and need to be synchronized with image acquisition to limit side-effects caused by the optical change itself.

The methods and systems of the present disclosure, as described above and shown in the drawings, provide for real-time embedded non-uniformity correction (NUC) calibration and enhancing scene capture capabilities. While the apparatus and methods of the subject disclosure have been shown and described, those skilled in the art will readily appreciate that changes and/or modifications may be made thereto without departing from the scope of the subject disclosure.

What is claimed is:

1. An imaging system used in a moving platform for guiding the moving platform, the imaging system comprising:
    an enclosure with an objective aperture opening into an interior space of the enclosure;
    an optical assembly optically coupling the objective aperture to an imaging sensor within the enclosure;
    a spatial light modulator (SLM) mounted to the objective aperture for selectively blocking and admitting illumination through the objective aperture into the interior space;
    an illuminator mounted to illuminate the interior space of the enclosure;
    an imaging board, wherein the imaging sensor is operatively connected to the imaging board;
    a SLM controller operatively connected to the imaging board to control the SLM; and
    an illuminator controller operatively connected to the imaging board to control the illuminator, wherein the imaging board includes machine readable instructions configured to cause the imaging board to perform an imaging system calibration, the imaging system calibration comprising:
    blocking, with the SLM, illumination outside the enclosure from reaching the interior space;
    illuminating, with the illuminator, the interior space; and
    capturing, with the imaging sensor, a calibration image using illumination from the illuminator; and wherein the machine readable instructions are further configured to cause the imaging system to provide an imaging mode for guiding the moving platform, wherein in the imaging mode the blocking further includes using the SLM to actively block one or more bright spots from reaching the imaging sensor.

2. The imaging system as recited in claim 1, further comprising, a window disposed in the objective aperture bounding the interior space together within the enclosure, wherein the SLM is assembled to the window.

3. The imaging system as recited in claim 1, wherein the machine readable instructions are configured to further cause the imaging board to use the calibration image to calibrate the imaging sensor for capturing images with non-uniformity correction.

4. The imaging system as recited in claim 3, wherein the machine readable instructions are configured to further cause the imaging board to compensate for an illumination gradient on the imaging sensor from non-uniform illumination from the illuminator on the imaging sensor.

5. The imaging system as recited in claim 4, wherein the machine readable instructions are configured to further cause the imaging board to run calibration at multiple illumination levels of the illuminator and form a respective calibration image at each illumination level for non-uniformity calibration.

6. The imaging system as recited in claim 5, wherein the machine readable instructions are configured to further cause the imaging board to form non-uniformity corrected images after calibration is complete.

7. The imaging system as recited in claim 1, wherein the imaging sensor is sensitive to SWIR wavelengths.

8. A method used in an imaging system for guiding a moving platform comprising:
    performing a calibration of the imaging system by:
        blocking, with an SLM mounted to an objective aperture, illumination outside an enclosure of the objective aperture from reaching an interior space of the enclosure;
        illuminating, with an illuminator, the interior space; and
        capturing, with an imaging sensor optically coupled to the objective aperture, a calibration image using illumination from the illuminator; and
    in an imaging mode for guiding the moving platform, using the SLM to actively block one or more bright spots from reaching the imaging sensor.

9. The method as recited in claim 8, further comprising, using the calibration image to calibrate the imaging sensor for capturing images with non-uniformity correction.

10. The method as recited in claim 9, further comprising compensating for an illumination gradient on the imaging sensor from non-uniform illumination from the illuminator on the imaging sensor.

11. The method as recited in claim 10, further comprising, running calibration at multiple illumination levels of the illuminator and forming a respective calibration image at each illumination level for non-uniformity calibration.

12. The method as recited in claim 11, further comprising forming non-uniformity corrected images after calibration is complete.

13. The method as recited in claim 12, wherein blocking further includes using the SLM to actively block direct sunlight from reaching the imaging sensor.

14. The method as recited in claim 12, wherein blocking further includes using the SLM to actively block counter measures.

15. The method as recited in claim 8, wherein the method is performed outside of a calibration lab, after an undesired external stimulus to the imaging sensor compromises an initial calibration that was performed prior to the shock to the imaging sensor.

* * * * *